US007912886B2

(12) United States Patent
Gopal et al.

(10) Patent No.: US 7,912,886 B2
(45) Date of Patent: Mar. 22, 2011

(54) CONFIGURABLE EXPONENT FIFO

(75) Inventors: Vinodh Gopal, Westboro, MA (US);
Wajdi Feghali, Boston, MA (US);
Gilbert M. Wolrich, Framingham, MA
(US); Daniel Cutter, Maynard, MA
(US); Robert P. Ottavi, Brookline, NH
(US)

(73) Assignee: Intel Corporation, Santa Clara, CA (US)

( * ) Notice: Subject to any disclaimer, the term of this patent is extended or adjusted under 35 U.S.C. 154(b) by 1101 days.

(21) Appl. No.: 11/610,841

(22) Filed: Dec. 14, 2006

(65) Prior Publication Data

US 2008/0147768 A1 Jun. 19, 2008

(51) Int. Cl.
*G06F 7/38* (2006.01)
*H04K 1/00* (2006.01)
*H04L 9/00* (2006.01)
*H04L 9/30* (2006.01)

(52) U.S. Cl. .......................................... 708/491; 380/30
(58) Field of Classification Search .......... 708/491–492;
380/30, 44, 277–285; 713/189
See application file for complete search history.

(56) References Cited

U.S. PATENT DOCUMENTS

| 6,044,416 | A | * | 3/2000 | Hasan | 710/52 |
| 6,282,290 | B1 | * | 8/2001 | Powell et al. | 380/28 |
| 7,106,098 | B1 | * | 9/2006 | Zack et al. | 326/40 |
| 7,127,063 | B2 | * | 10/2006 | Lambert et al. | 380/44 |
| 7,451,326 | B2 | * | 11/2008 | Zaabab | 713/189 |
| 2004/0139313 | A1 | * | 7/2004 | Buer et al. | 713/150 |
| 2004/0167952 | A1 | * | 8/2004 | Gueron et al. | 708/492 |
| 2007/0121935 | A1 | * | 5/2007 | Joye | 380/30 |

OTHER PUBLICATIONS

Thomas Blum, "Modular Exponentiation on Reconfigurable Hardware", Master's Thesis, Worcester Polytechnic Institute, Worcester MA, 1999.*

* cited by examiner

*Primary Examiner* — Chat C Do
*Assistant Examiner* — Matthew Sandifer
(74) *Attorney, Agent, or Firm* — Grossman, Tucker, Perreault & Pfleger, PLLC

(57) ABSTRACT

The present disclosure provides a system and method for performing modular exponentiation. The method includes loading a first word of a vector from memory into a first register and subsequently loading the first word from the first register to a second register. The method may also include loading a second word into the first register and loading at least one bit from the second register into an arithmetic logic unit. The method may further include performing modular exponentiation on the at least one bit to generate a result and generating a public key based upon, at least in part, the result. Of course, many alternatives, variations and modifications are possible without departing from this embodiment.

21 Claims, 8 Drawing Sheets

CONFIGURABLE EXPONENT FIFO

FIELD

The present disclosure describes a configurable exponent First-In, First-Out (FIFO).

BACKGROUND

Encryption algorithms may be classified as either private-key or public-key. Private-key encryption refers to an encryption method in which both the sender and receiver share the same key. Public-key encryption involves two different but related keys. One key is used for encryption and one for decryption. Many of today's encryption techniques utilize a public-key/private-key pair. Most public-key algorithms, such as Rivest, Shamir, Adelman (RSA) and Diffie-Helman, perform extensive computations that involve the modular exponentiation of extremely large numbers. These computationally expensive operations are critical in secure protocols such as the Internet Key Exchange (IKE) and the Secure Sockets Layer (SSL). Modular exponentiation operations may utilize vast memory resources, such as register files, and may require an excessive amount of area.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Public key exchange protocols may use a range of keys having different bit lengths. For example, some key exchange protocols may use keys having bit lengths of 1024, 2048, 3072, 4096, 8192 etc. During a public key negotiation, for example, between two parties over an untrusted network, each party may generate a public key. The security strength of the key is typically a function of the size (i.e., bit length) of the key.

To generate a key, each party may need to solve an equation of the form: $x = g^e \mod m$. Given two integers, $g^e$ and m, $g^e$ mod m yields the remainder (r) of the division of $g^e$ by m. This calculation may be difficult given the large size of the operands. The computation of the exponent $g^e$, where base g is an element of a finite group and the exponent e is a non-negative integer, may require an efficient method for multiplying, squaring and ensuring that the intermediate results produced by each iteration are smaller than the modulus m.

Some exponentiation techniques may require storing the entire exponent vector within memory (e.g. random-access-memory), which may require as much as 4096 bits of storage for each exponentiation problem. Moreover, in the case of a double exponentiation problem, two of these exponents must be stored, which may require over 8000 bits of available space. These methods may consume an excessive amount of valuable memory space, especially as increased security demands cause key lengths to increase.

Generally, this disclosure describes a method for performing modular exponentiation on large operands via a configurable (i.e. scalable) FIFO hardware unit. The embodiments described herein may be used to minimize the area required to handle large exponent vectors, thus providing valuable space that may be needed for register files and/or control store. This disclosure provides a scalable method that may be applied to exponent vectors of increasing size, such as those in excess of 8000 bits or more.

Figure 1:
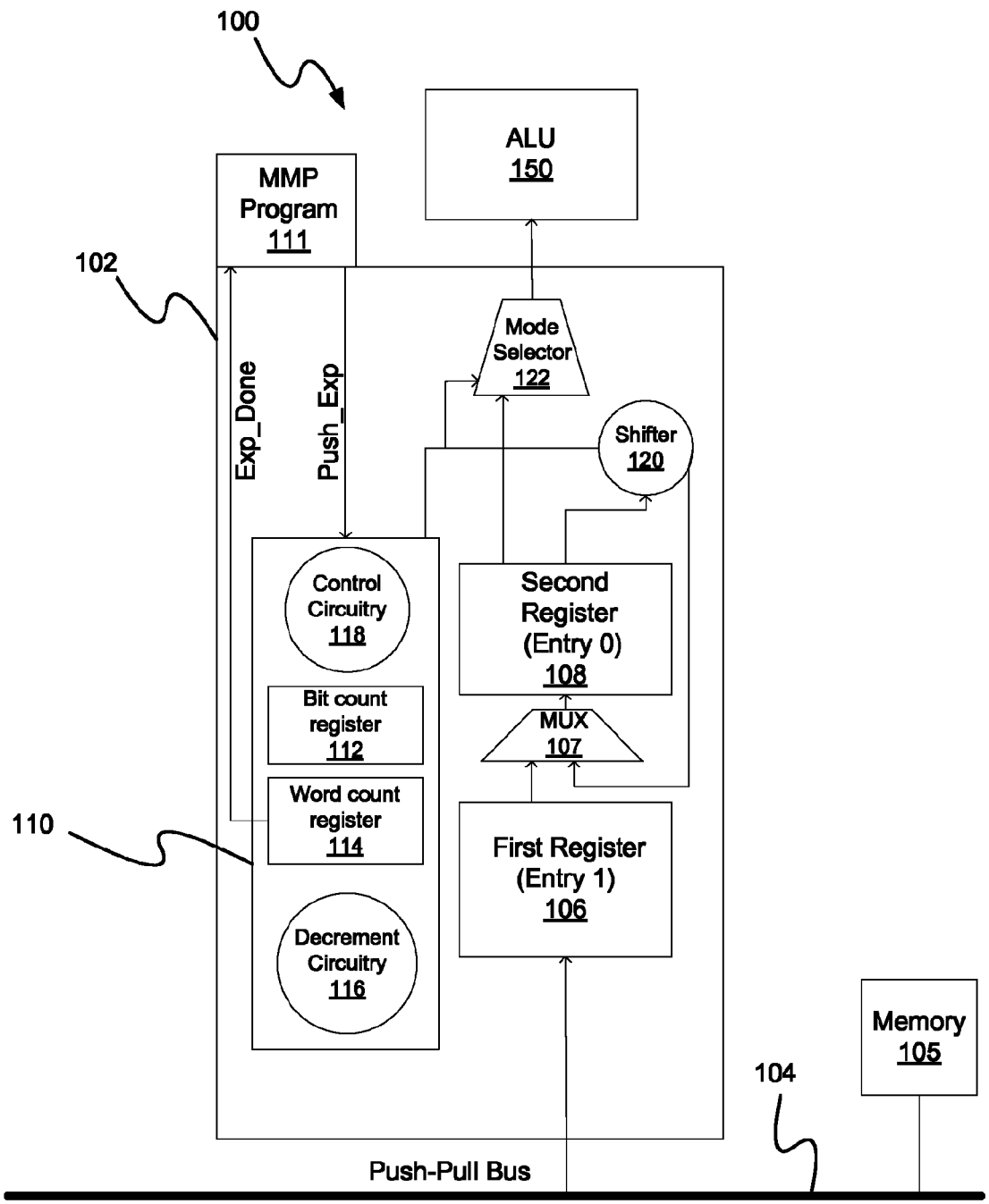
FIG. 1 is a diagram showing one exemplary embodiment in accordance with the present disclosure.

FIG. 1 shows an exemplary embodiment of circuitry 100 in accordance with the present disclosure. Circuitry 100 may include FIFO unit 102, which may be configured to receive vector exponent data from a bus 104 (e.g. a push-pull bus). For example, a 4096 bit vector exponent may occupy 64 words. Each word (e.g., 64 bits) of the vector exponent may be loaded into a first register 106 and subsequently to a second register 108, located within FIFO unit 102. The vector exponent data may be stored in system memory 105 and loaded into first register 106 in sections. In some embodiments, registers 106 and 108 may be configured to hold varying bit lengths (e.g. 65 bits). A multiplexer 107 may be configured to receive data from first register 106 and shifter unit 120 as is discussed below. The output of multiplexer 107 may be loaded into second register 108. FIFO unit 102 may be configured to communicate with a number of different components, including but not limited to, arithmetic logic unit (ALU) 150. Of course, FIFO unit 102 may send and receive data with a number of different components, some of which are described herein with reference to FIG. 6.

FIFO unit 102 may further include additional registers that may be located within communication circuitry 110. Communication circuitry 110 may include bit count register 112, word count register 114, decrementer circuitry 116 and control circuitry 118. Communication circuitry 110 may be connected to a shift circuitry 120, which may be configured to perform a shift operation on the contents of a register (e.g., first register 106 and/or second register 108). Communication circuitry 110 may be further configured to communicate with a modular math processor (MMP) program 111.

MMP program 111 may be used to initialize a FIFO unit 102 using a setup instruction. The setup instruction may set the number of words of the exponent (e.g. 64 words) and determine whether to use a left-to-right or right-to-left binary exponentiation. The selection and/or deselection between left-to-right and right-to-left exponentiation may be performed using mode selector 122. Examples of these two types of binary exponentiation are provided below:

EXAMPLE 1

Left-to-Right Binary Exponentiation
INPUT: g and positive integer $e=(e_t e_{t-1} \ldots e_1 e_0)_2$
OUTPUT: $g^e$
1. $A \leftarrow 1$
2. For i from t down to 0 do:
   a. $A \leftarrow A*A$
   b. If $e_i=1$, then $A \leftarrow A*g$
3. Return(A)

The table below shows the values of A during each iteration for computing $g^{283}$. Note t=8 and 283 is represented by the binary string $(100011011)_2$.

| i | 8 | 7 | 6 | 5 | 4 | 3 | 2 | 1 | 0 |
|---|---|---|---|---|---|---|---|---|---|
| $e_i$ | 1 | 0 | 0 | 0 | 1 | 1 | 0 | 1 | 1 |
| A | g | $g^2$ | $g^4$ | $g^8$ | $g^{17}$ | $g^{35}$ | $g^{70}$ | $g^{141}$ | $g^{283}$ |

Alternatively, in some embodiments FIFO unit 102 may be configured to perform exponentiation by scanning the exponent bits from right-to-left (i.e., from least significant bit to most significant bit). An example of right-to-left binary exponentiation is shown below in Example 2.

EXAMPLE 2

Right-to-Left Binary Exponentiation
INPUT: g and positive integer $e=(e_t e_{t-1} \ldots e_1 e_0)_2$
OUTPUT: $g^e$
1. $A \leftarrow 1$, $S \leftarrow g$
2. while $e \neq 0$ do:
   a. If $e_0=1$, then $A \leftarrow A.S$
   b. $e=\text{floor}(e/2)$
   c. if $e \neq 0$ then $S \leftarrow S.S$
3. Return(A)

The following table displays the values of A, e, and S during each iteration of the right to left example above for computing $g^{283}$. A more detailed description of the techniques shown in Examples 1 and 2 may be found in *The Handbook of Applied Cryptography* authored by Alfred Menezes et al., published Jan. 1, 1997 by CRC press.

| A | 1 | g | $g^3$ | $g^3$ | $g^{11}$ | $g^{27}$ | $g^{27}$ | $g^{27}$ | $g^{27}$ | $g^{283}$ |
|---|---|---|---|---|---|---|---|---|---|---|
| e | 283 | 141 | 70 | 35 | 17 | 8 | 4 | 2 | 1 | 0 |
| S | g | $g^2$ | $g^4$ | $g^8$ | $g^{16}$ | $g^{32}$ | $g^{64}$ | $g^{128}$ | $g^{256}$ | — |

In operation, the initialization sequence may begin when the modular math processor (MMP) program 111 issues a setup instruction to FIFO unit 102. This setup instruction may be processed via control circuitry 118. The setup instruction may set the number of words (e.g., 64) and the mode to either a right-to-left or left-to-right mode. Initially, the contents of registers 106 and 108 may be cleared. FIFO unit 102 may then pull in exponent words from system memory 105 through bus 104 starting with the most significant word if using a left-to-right mode. As soon as second register 108 is filled, FIFO unit 102 may check to see if second register 108 is zero. If second register 108 is zero, FIFO unit 102 may pull the contents of first register 106 into second register 108 freeing up first register 106 and decrementing word count register 114. This may continue until the first non-zero word is found in second register 108. FIFO unit 102 may utilize control circuitry 118 to remove any leading zeros from second register 108. This may be performed via the operation entry0=entry0<<1, until the most-significant bit (MSB)=1. In some embodiments, bit-count register 112 may be decremented with each shift, in order to complete the initialization process. Alternatively, the right-to-left mode may be activated via mode selector 122 and implemented by loading words starting with the least-significant word. In some embodiments, the right-to-left mode may not require a leading-zero check during the initialization process.

During execution, MMP program 111 may check word count register 114 to determine whether the exponent is empty via a signal (e.g., exp_done [0]). If not, MMP program 111 may execute an instruction (e.g., push_exp) that obtains the next bit (e.g., the msb in the left-to-right mode) and may perform a left-shift of entry0 of second register 108, thus decrementing bit-counter register 112. For example, if entry0 has been consumed (i.e., bit-count register 112 is zero) the word-count register 114 may be decremented, the bit-counter 112 may be reset to 64 and entry0←entry1. When the exponent has been processed, a signal (e.g., push_exp) may return a zero. Alternatively, in right-to-left mode the behavior of FIFO unit 102 may be similar, however, right-to-left mode may return the least significant bit and the shifting operations performed on entry0 may require a logical-right shift.

Figure 2:
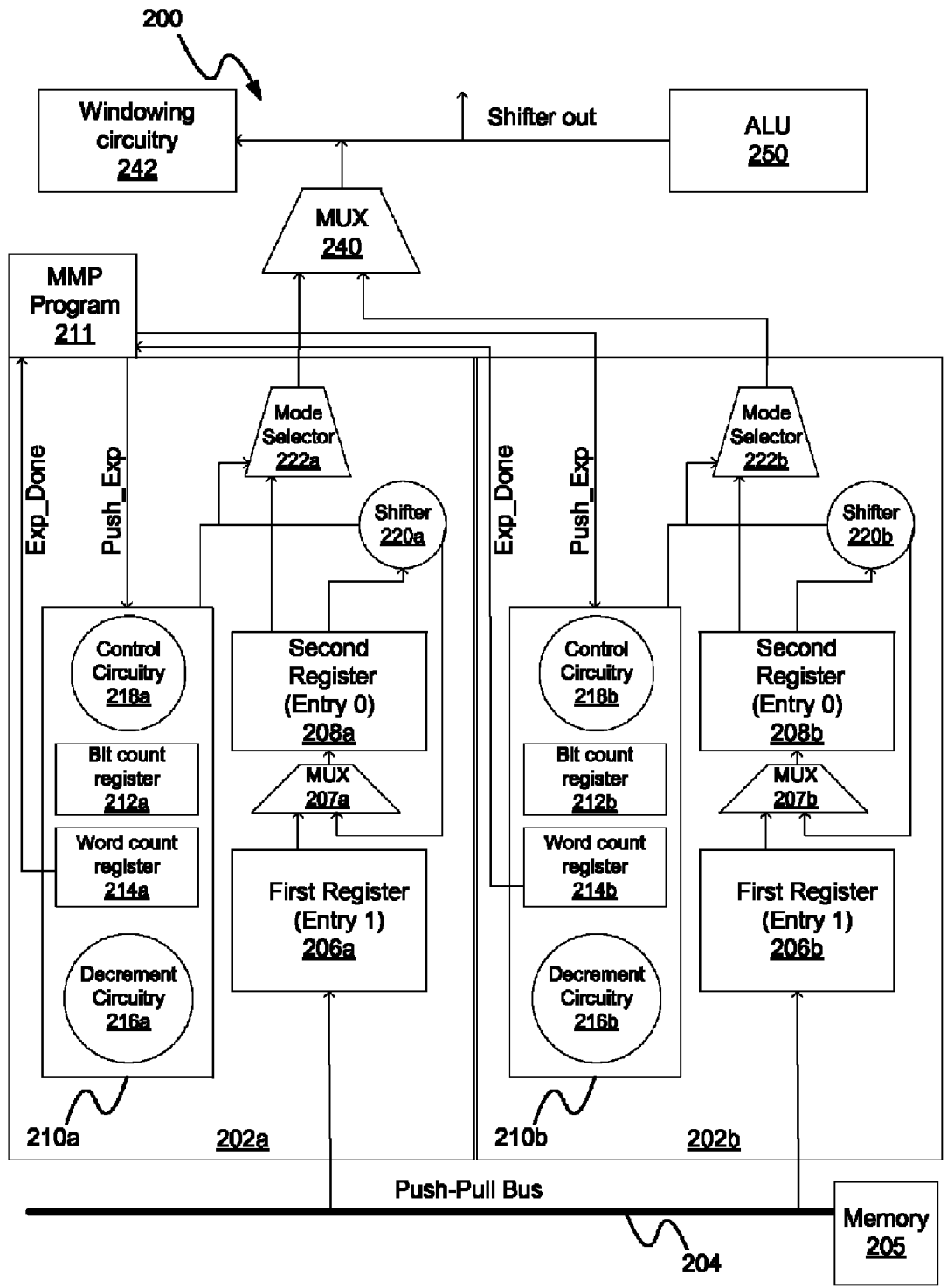
FIG. 2 is a diagram showing another exemplary embodiment in accordance with the present disclosure.

FIG. 2 shows another exemplary embodiment 200 in accordance with the present disclosure. This embodiment may include multiple FIFO units 202a, 202b, which may be configured to perform advanced exponentiation calculations. For example, in order to perform double exponentiation calculations (e.g., in excess of 8000 bits) the MMP program may setup two or more FIFO units 202a-n. For example, a fixed number of bits may be alternately pushed from FIFO units 202a and 202b. In some embodiments, during left-to-right mode the MMP program may disable the leading-zero stripping via control circuitry 218 to provide accurate simultaneous operation. The outputs of each FIFO unit 202a, 202b, etc. may be fed into a multiplexer 240, which may be configured to connect the outputs from units 202a-b and to deliver an output to various components, including, but not limited to, windowing circuitry 242 and ALU 250.

The embodiments described herein may utilize remaining Data RAM space to perform sliding or fixed exponent windowing, which may allow the system to optimize performance. Exponent windowing circuitry 242 may calculate windows on long exponents for the purpose of reducing the number of multiplications required in modular exponentiation. In exponent windowing, the exponent may be treated as a binary string and the bits may be scanned in either a left-to-right or right-to-left orientation. The left-to-right approach may be improved by grouping the exponent bits into k-bit sections. This approach may scan the bits of the exponent to determine the next group (i.e., window) to be multiplied as the exponent slides from left to right. This exponent windowing approach may be used in accordance with any or all of the embodiments described herein to further enhance system performance.

Figure 3:
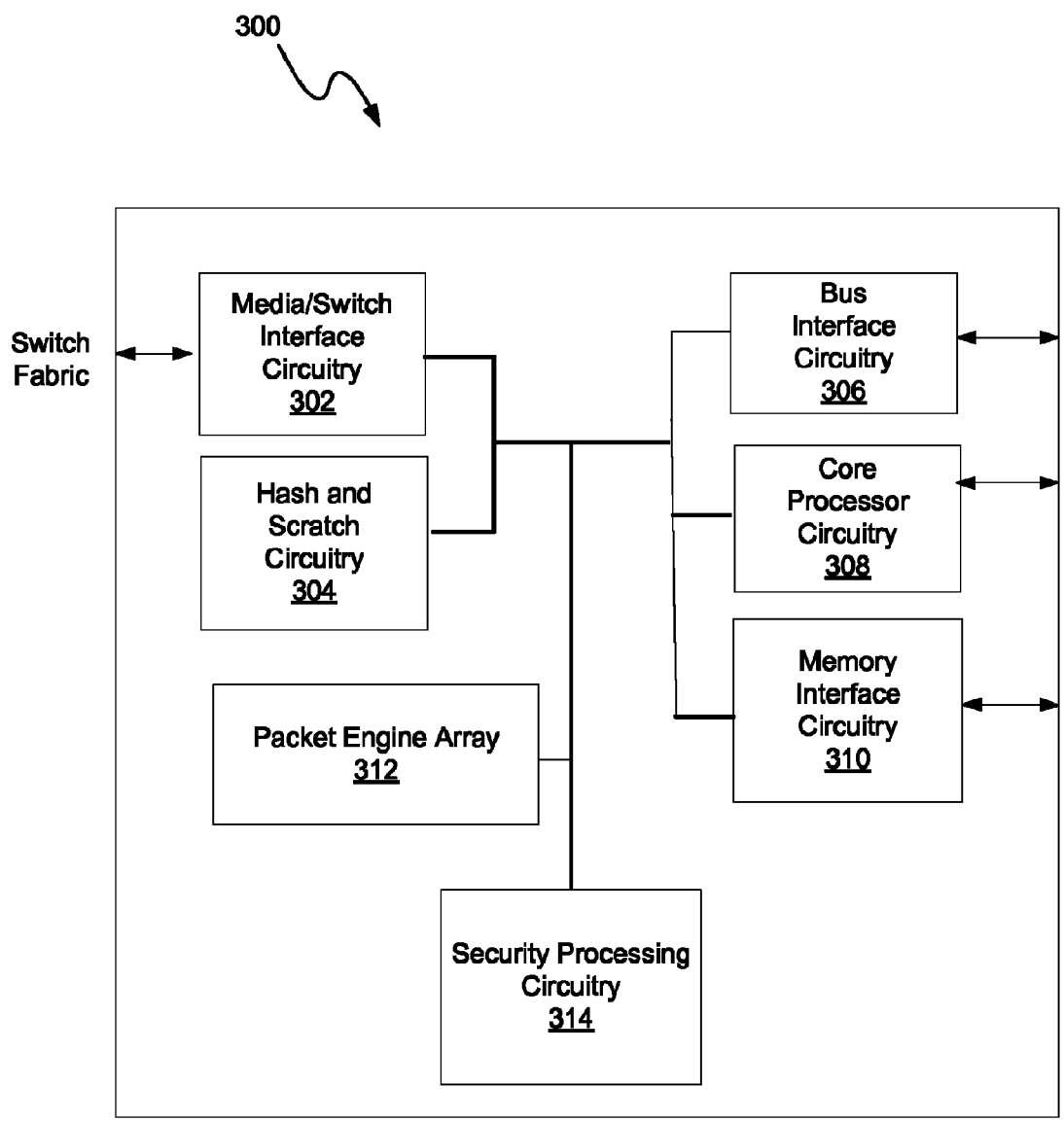
FIG. 3 is a block diagram depicting portions of a network processor in accordance with one embodiment of the present disclosure.

The embodiments of FIGS. 1 and 2 may be implemented, for example, in a variety of multi-threaded processing environments. For example, FIG. 3 is a diagram illustrating one exemplary integrated circuit embodiment (IC) 300 in which may be configured to perform any or all of the aspects of the embodiments described herein. "Integrated circuit", as used in any embodiment herein, means a semiconductor device and/or microelectronic device, such as, a semiconductor integrated circuit chip. The IC 300 of this embodiment may include features of an Intel® Internet eXchange network processor (IXP). However, the IXP network processor is only provided as an example, and the operative circuitry described herein may be used in other network processor designs and/or other multi-threaded integrated circuits.

The IC 300 may include media/switch interface circuitry 302 (e.g., a CSIX interface) capable of sending and receiving data to and from devices connected to the integrated circuit such as physical or link layer devices, a switch fabric, or other processors or circuitry. The IC 300 may also include hash and scratch circuitry 304 that may execute, for example, polynomial division (e.g., 48-bit, 64-bit, 128-bit, etc.), which may be used during some packet processing operations. The IC 300 may also include bus interface circuitry 306 (e.g., a peripheral component interconnect (PCI) interface) for communicating with another processor such as a microprocessor (e.g. Intel Pentium®, etc.) or to provide an interface to an external device such as a public-key cryptosystem (e.g., a public-key accelerator) to transfer data to and from the IC 300 or external memory. The IC may also include core processor circuitry 308. In this embodiment, core processor circuitry 308 may comprise circuitry that may be compatible and/or in compliance with the Intel® XScale™ Core micro-architecture described in "Intel® XScale™ Core Developers Manual," published December 2000 by the Assignee of the subject application. Of course, core processor circuitry 308 may comprise other types of processor core circuitry without departing from this embodiment. Core processor circuitry 308 may perform "control plane" tasks and management tasks (e.g., look-up table maintenance, etc.). Alternatively or additionally, core processor circuitry 308 may perform "data plane" tasks (which may be typically performed by the packet engines included in the packet engine array 312, described below) and may provide additional packet processing threads.

Integrated circuit 300 may also include a packet engine array 312. The packet engine array may include a plurality of packet engines. Each packet engine may provide multi-threading capability for executing instructions from an instruction set, such as a reduced instruction set computing (RISC) architecture. Each packet engine in the array 312 may be capable of executing processes such as packet verifying, packet classifying, packet forwarding, and so forth, while leaving more complicated processing to the core processor circuitry 308. Each packet engine in the array 312 may include e.g., eight threads that interleave instructions, meaning that as one thread is active (executing instructions), other threads may retrieve instructions for later execution. Of course, one or more packet engines may utilize a greater or fewer number of threads without departing from this embodiment. The packet engines may communicate among each other, for example, by using neighbor registers in communication with an adjacent engine or engines or by using shared memory space.

Integrated circuit 300 may also include memory interface circuitry 310. Memory interface circuitry 310 may control read/write access to external memory. Machine readable firmware program instructions may be stored in external memory, and/or other memory internal to the IC 300. These instructions may be accessed and executed by the integrated circuit 300. When executed by the integrated circuit 300, these instructions may result in the integrated circuit 300 performing the operations described herein (e.g., operations described with reference to FIG. 8).

Figure 4:
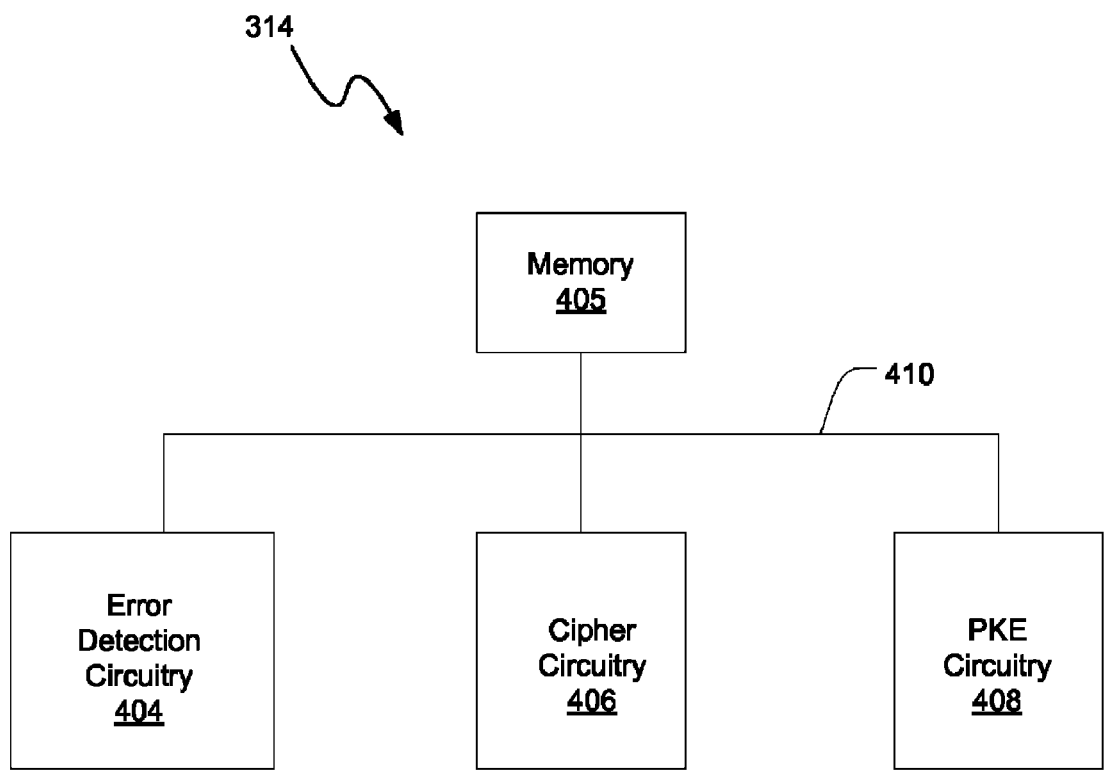
FIG. 4 is a block diagram showing further detail of a security processor in accordance with an embodiment of the present disclosure.

IC 300 may further include security processing circuitry 314. Security processor circuitry 314 may be configured to perform encryption operations which may include modular exponentiation operations (as described herein) for generating a public key. Referring now to FIG. 4, security processing circuitry 314 may include system memory 405 operatively connected to error detection circuitry 404, cipher circuitry 406 and public key encryption (PKE) circuitry 408 through internal bus 410. Error detection circuitry 404 may be configured to perform hash functions that may be used as a redundancy check or checksum. Some types of redundancy checks could include, but are not limited to, parity bits, check digits, longitudinal redundancy checks, cyclic redundancy checks, horizontal redundancy check, vertical redundancy checks, and cryptographic message digest. Security processing circuitry 314 may also include both private and public key modules. Cipher circuitry 406 may be configured to generate private keys, which may include execution of symmetric and/or private-key data encryption algorithms such as the data encryption standard (DES) or advanced encryption standard (AES). PKE circuitry 408 may be configured to execute an asymmetric key encryption algorithm and may include generating a public-key/private-key pair.

Figure 5:
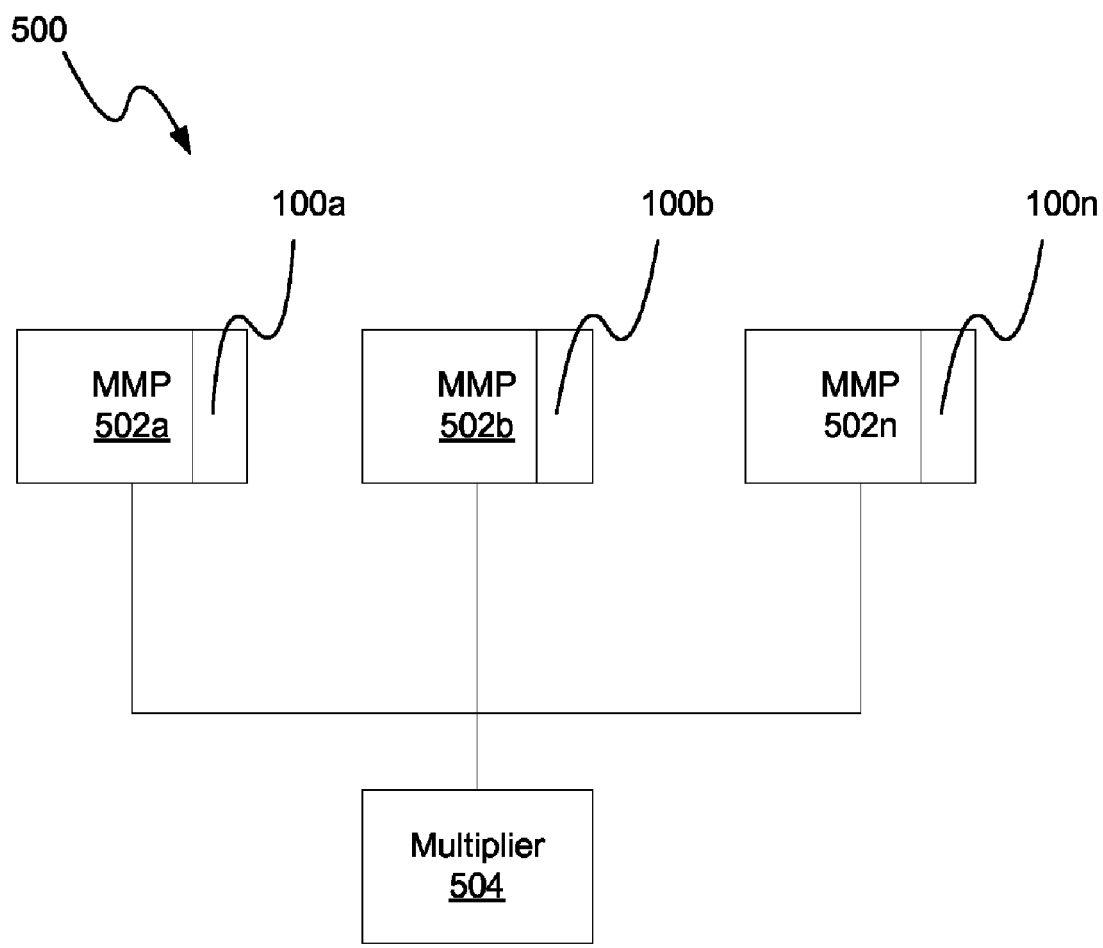
FIG. 5 is a block diagram showing circuitry in accordance with an embodiment of the present disclosure.

One embodiment of PKE circuitry 500 is shown in FIG. 5. PKE circuitry 500 may include a plurality of modular math processors (MMPs) 502a, 502b, . . . , 502n. Each MMP may include at least one arithmetic logic unit (ALU) configured to perform vector operations. MMPs 502 may also include a control store for the operations described herein as well as large register files configured to store operands, temporary variables and final results. PKE circuitry 500 may further include a multiplier 504 operatively connected to modular math processors 502a-n. In at least one embodiment, multiplier 504 may be a large (e.g., 515×515) unsigned integer multiplier. PKE circuitry 500 may be used in accordance with the present disclosure to perform the mathematical operations and execute the methods described herein. For example, the embodiments shown and described with reference to FIGS. 1 and 2 may be implemented as a subcomponent (e.g., 100a-n or 200a-n) within each modular math processor 502a-n.

Figure 6:
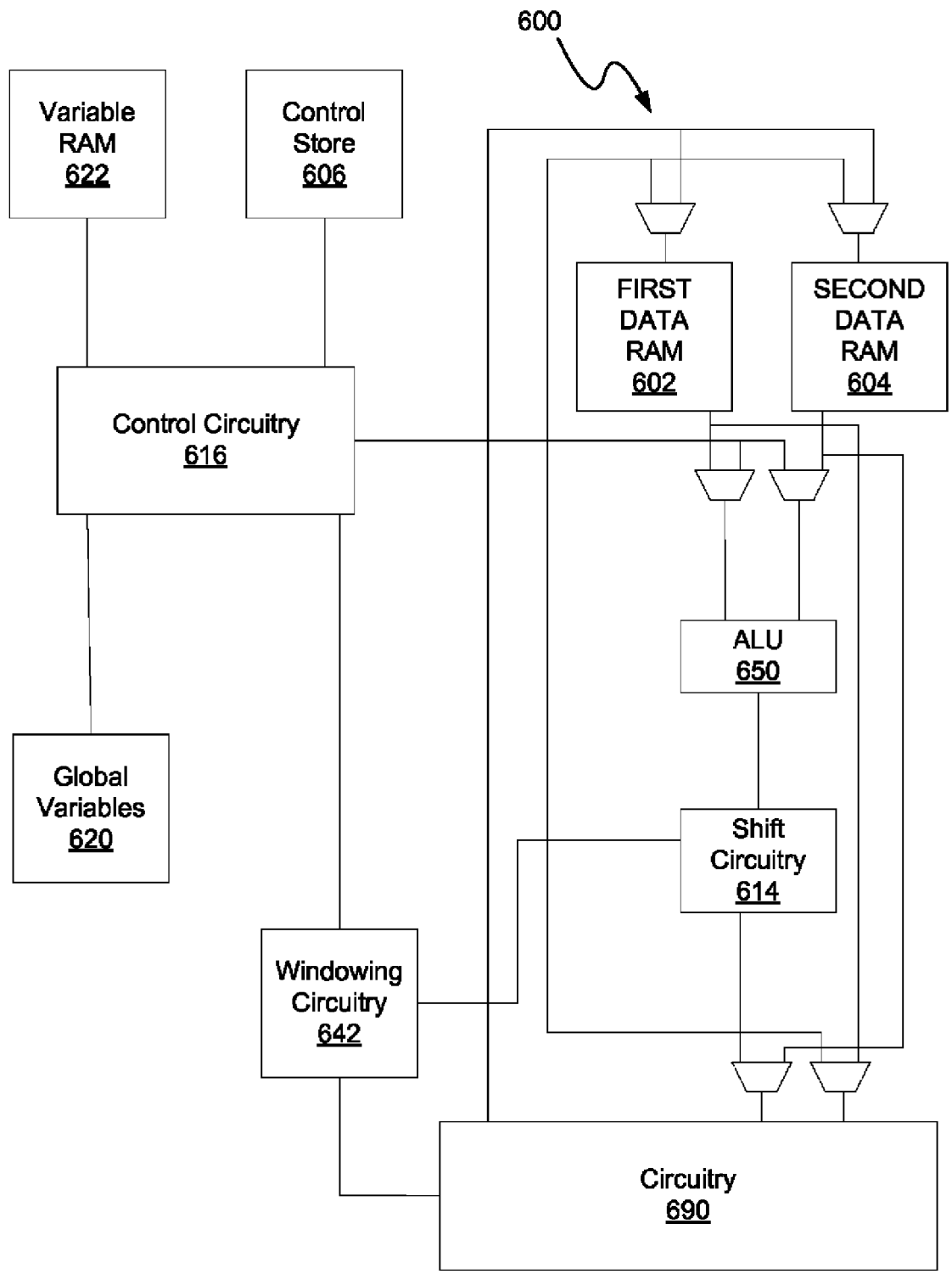
FIG. 6 is a block diagram illustrating one exemplary embodiment of a modular math processor.

Referring now to FIG. 6 an exemplary embodiment of an MMP 600 is shown. MMP 600 may be configured to perform operations on large operands (e.g., 512 to 8000 bits) that may be contained in a smaller data path (e.g., 32, 64, 128 bits) in order to accomplish large operand multiplication, addition, exponentiation and/or modular reduction techniques, such as Barrett's and Montgomery reduction. MMP 600 may include first and second data RAMs 602, 604, which may be configured to receive vector operands from circuitry 690. Circuitry 690 may include any or all of the embodiments described herein. Circuitry 690 may be in communication with ALU 650 and may be configured to process a variety of instructions including, but not limited to, GCD algorithms, Chinese remainder theorem algorithms, Barrett's reduction, etc. In some embodiments, circuitry 690 may communicate directly with ALU 650 and may be configured to receive data directly from system memory (not shown). MMP 600 may further include control store memory 606, shift circuitry 614, control circuitry 616 and ALU 650. Control circuitry 616 may be in communication with additional components, such as, windowing circuitry 642, global variables 620 and variable RAM 622.

Figure 7:
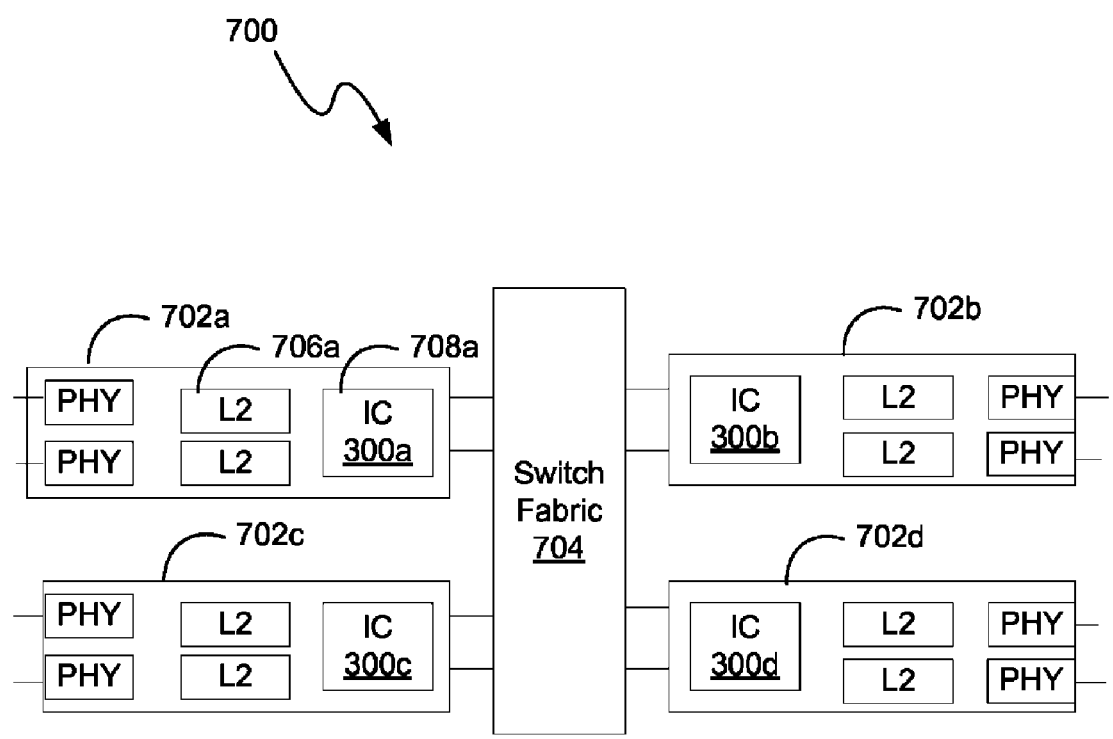
FIG. 7 is a diagram illustrating one exemplary system embodiment.

FIG. 7 depicts one exemplary system embodiment 700. This embodiment may include a collection of line cards 702a, 702b, 702c and 702d ("blades") interconnected by a switch fabric 704 (e.g., a crossbar or shared memory switch fabric). The switch fabric 704, for example, may conform to CSIX or other fabric technologies such as HyperTransport™, I/O Link Specification, Revision 3.0, available from HyperTransport™ Technology Consortium, Apr. 21, 2006; Infiniband™, Specification 1.2, available from InfiniBand™ Trade Association, Sep. 8, 2004; PCI-X 2.0, Revision 1.0, Apr. 5, 2002;

Packet-Over-SONET; RapidIO, Specification 1.3, available from RapidIO Trade Association, June 2005; and Utopia Specification Level 1, Version 2.01, available from the ATM Forum, Mar. 21, 1994. Individual line cards (e.g., 702a) may include one or more physical layer (PHY) devices 702a (e.g., optic, wire, and wireless PHYs) that handle communication over network connections. The PHYs may translate between the physical signals carried by different network mediums and the bits (e.g., "0"-s and "1"-s) used by digital systems. The line cards may also include framer devices 706a (e.g., Ethernet, Synchronous Optic Network (SONET), High-Level Data Link (HDLC) framers or other "layer 2" devices) that can perform operations on frames such as error detection and/or correction. The line cards shown may also include one or more integrated circuits, e.g., 300a, which may include network processors, and may be embodied as integrated circuit packages (e.g., ASICs). In addition to the operations described herein, in some embodiments integrated circuit 300a may also perform packet processing operations for packets received via the PHY(s) 702a and direct the packets, via the switch fabric 704, to a line card providing the selected egress interface.

Figure 8:
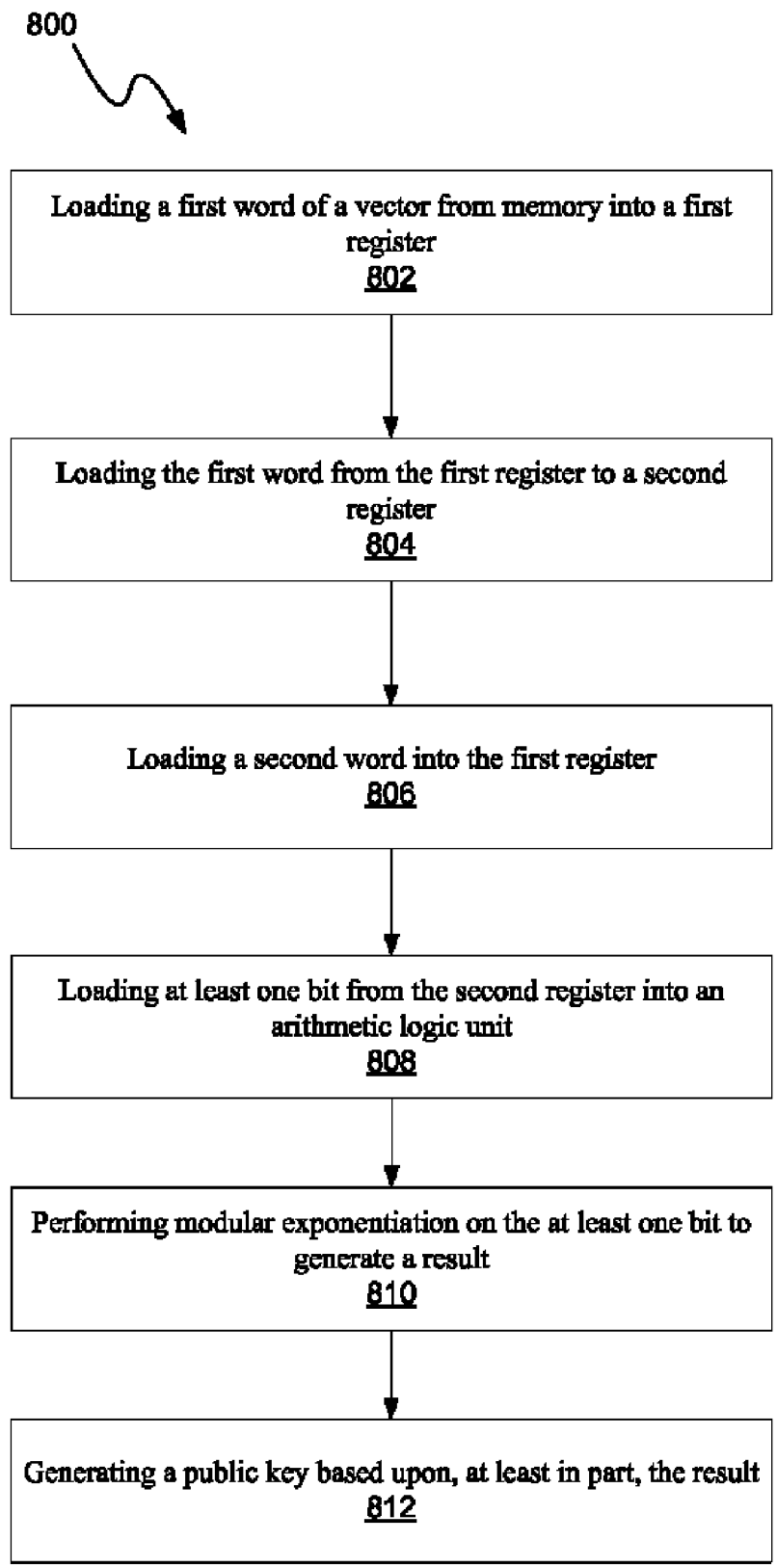
FIG. 8 is a flowchart showing operations consistent with yet another exemplary embodiment.

FIG. 8 shows a flowchart 800 illustrating one method consistent with the present disclosure. Flowchart 800 depicts operations that may be used to perform modular exponentiation on an exponent vector. Operations may include loading a first word of a vector from memory into a first register (802). Operations may further include loading the first word from the first register to a second register (804). Operations may also include loading a second word into the first register (806). Operations may additionally include loading at least one bit from the second register into an arithmetic logic unit (808). Operations may further include performing modular exponentiation on the at least one bit to generate a result (810) and generating a public key based upon, at least in part, the result (812).

As used in any embodiment described herein, "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

In alternate embodiments, the embodiments of FIGS. 1-8 may be configured as a "network device", which may comprise for example, a switch, a router, a hub, and/or a computer node element configured to process data packets, a plurality of line cards connected to a switch fabric (e.g., a system of network/telecommunications enabled devices) and/or other similar device. Also, the term "cycle" as used herein may refer to clock cycles. Alternatively, a "cycle" may be defined as a period of time over which a discrete operation occurs which may take one or more clock cycles (and/or fraction of a clock cycle) to complete. Additionally, the operations described above may be executed on one or more integrated circuits of a computer node element, for example, executed on a host processor (which may comprise, for example, an Intel® Pentium® microprocessor and/or an Intel® Pentium® D dual core processor and/or other processor that is commercially available from the Assignee of the subject application) and/or chipset processor and/or application specific integrated circuit (ASIC) and/or other integrated circuit.

Embodiments of the methods described above may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

The embodiments described herein may provide numerous advantages over the prior art. The amount of area required to implement any or all of the aforementioned operations may be reduced using the techniques described herein. For example, the methods described above may be used to conserve a substantial amount of Data RAM space, which may be useful for storing register files. Further, the embodiments described herein are easily applied to the problem of double exponentiation, which may involve operands of 8000 bits or more. The embodiments described herein may consume a fixed amount area, which may not increase with the size of the exponent and may be capable of conserving a considerable amount of modular math processor program space.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus, comprising:
an integrated circuit (IC) configured to load a first word of an exponent vector having a plurality of words from memory into a first register, wherein the first register is configured to hold a number of bits corresponding to one word;
the IC further configured to load the first word from the first register to a second register, wherein the second register is configured to hold the number of bits corresponding to one word;
the IC further configured to load a second word of the exponent vector into the first register, wherein the second word is sequential in position to the first word in the exponent vector;
the IC further configured to load at least one bit from the second register into an arithmetic logic unit (ALU);
the IC further configured to perform modular exponentiation on the at least one bit from the second register to generate a first result;
the IC further configured to generate a public key based upon, at least in part, the first result;
the IC further configured to perform double exponentiation, wherein the IC is configured to:
load a third word of the exponent vector into a third register wherein the third register is configured to hold the number of bits corresponding to one word,
load the third word from the third register to a fourth register wherein the fourth register is configured to hold the number of bits corresponding to one word,
load a fourth word of the exponent vector into the third register, wherein the fourth word is sequential in position to the third word in the exponent vector, load at least one bit from the fourth register to the ALU,
perform modular exponentiation on the at least one bit from the fourth register to generate a second result, and
generate a public key based upon, at least in part, the second result,
wherein the IC is further configured to alternate loading the at least one bit from the second register and the at least one bit from the fourth register into the ALU.

2. The apparatus according to claim 1, wherein the IC is further configured to iteratively load each word of the plurality of words into the first register and to iteratively load each word from the first register to the second register if the second register is empty.

3. The apparatus according to claim 1, wherein the vector is stored in system memory.

4. The apparatus according to claim 1, wherein the first and second registers are operatively connected to communication circuitry wherein the communication circuitry is configured to initialize a word count register to a number of words in the vector, the communication circuitry further configured to perform:
bit counting by setting a bit count register to the number of bits when the first word from the first register is loaded into the second register and decrementing the bit count register for each bit loaded from the second register into the ALU,
word counting by decrementing the word count register when the bit count register is zero, and
leading zero detection upon the contents of the second register if a mode is a left-to-right mode, wherein leading zero detection comprises determining whether the second register is zero when the second register contains the first word, and loading the second word from the first register into the second register if the second register is zero or left-shifting the contents of the second register if the second register is not zero until a most significant bit of the second register is not zero.

5. The apparatus according to claim 1, wherein the IC is further configured to load a most significant bit of the second register if a left-to-right mode is selected or a least significant bit of the second register if a right-to-left mode is selected, wherein mode selection is performed by a mode selector and the first word corresponds to a most significant word if the left-to-right mode is selected or the first word corresponds to a least significant word if the right-to-left mode is selected.

6. The apparatus according to claim 1, wherein the IC is further configured to perform exponent windowing upon the vector, wherein the IC is configured to scan the second register to determine a group of bits to be multiplied wherein the group of bits to be multiplied comprises a number of bits less than or equal to a size of a window.

7. A method, comprising:
loading a first word of an exponent vector from memory into a first register, wherein the first register is configured to hold a number of bits corresponding to one word;
loading the first word from the first register to a second register, wherein the second register is configured to hold the number of bits corresponding to one word;
loading a second word of the exponent vector into the first register, wherein the second word is sequential in position to the first word in the exponent vector;
loading at least one bit from the second register into an arithmetic logic unit;
performing modular exponentiation on the at least one bit from the second register to generate a first result;
generating a public key based upon, at least in part, the first result;
performing double exponentiation, comprising:
loading a third word of the exponent vector into a third register wherein the third register is configured to hold the number of bits corresponding to one word,
loading the third word from the third register to a fourth register wherein the fourth register is configured to hold the number of bits corresponding to one word,
loading a fourth word of the exponent vector into the third register, wherein the fourth word is sequential in position to the third word in the exponent vector,
loading at least one bit from the fourth register to the ALU,
performing modular exponentiation on the at least one bit from the fourth register to generate a second result, and
generating a public key based upon, at least in part, the second result; and
alternating loading the at least one bit from the second register and the at least one bit from the fourth register into the ALU.

8. The method according to claim 7, further comprising iteratively loading each word of the plurality of words into the first register and iteratively loading each word from the first register to the second register if the second register is empty.

9. The method according to claim 7, wherein the vector is stored in system memory.

10. The method according to claim 7, wherein the first and second registers are operatively connected to communication circuitry wherein the communication circuitry is configured to initialize a word count register to a number of words in the vector, the communication circuitry further configured to perform:
bit counting by setting a bit count register to the number of bits when the first word from the first register is loaded into the second register and decrementing the bit count register for each bit loaded from the second register into the ALU,
word counting by decrementing the word count register when the bit count register is zero, and
leading zero detection upon the contents of the second register if a mode is a left-to-right mode, wherein leading zero detection comprises determining whether the second register is zero when the second register contains the first word, and loading the second word from the first register into the second register if the second register is zero or left-shifting the contents of the second register if the second register is not zero until a most significant bit of the second register is not zero.

11. The method according to claim 7, further comprising loading a most significant bit of the second register if a left-to-right mode is selected or a least significant bit of the second register if a right-to-left mode is selected, wherein mode selection is performed by a mode selector and the first word corresponds to a most significant word if the left-to-right mode is selected or the first word corresponds to a least significant word if the right-to-left mode is selected.

12. The method according to claim 7, further comprising performing exponent windowing upon the vector comprising scanning the second register to determine a group of bits to be multiplied wherein the group of bits to be multiplied comprises a number of bits less than or equal to a size of a window.

13. An article comprising a non-transitory storage medium having stored thereon instructions that when executed by a machine result in the following:
loading a first word of a vector from memory into a first register, wherein the first register is configured to hold a number of bits corresponding to one word;
loading the first word from the first register to a second register, wherein the second register is configured to hold the number of bits corresponding to one word;
loading a second word into the first register;
loading at least one bit from the second register into an arithmetic logic unit;
performing modular exponentiation on the at least one bit from the second register to generate a first result;
generating a public key based upon, at least in part, the first result;
performing double exponentiation comprising:
loading a third word of the vector into a third register wherein the third register is configured to hold the number of bits corresponding to one word,
loading the third word from the third register to a fourth register wherein the fourth register is configured to hold the number of bits corresponding to one word,
loading a fourth word into the third register,
loading at least one bit from the fourth register to the ALU,
performing modular exponentiation on the at least one bit from the fourth register to generate a second result, and
generating a public key based upon, at least in part, the second result; and alternating loading the at least one bit from the second register and the at least one bit from the fourth register into the ALU.

14. The article according to claim 13, further comprising iteratively loading each word of the plurality of words into the first register and iteratively loading each word from the first register to the second register if the second register is empty.

15. The article according to claim 13, wherein the first and second registers are included within a FIFO unit.

16. The article according to claim 13, wherein the first and second registers are operatively connected to communication circuitry wherein the communication circuitry is configured to initialize a word count register to a number of words in the vector, the communication circuitry further configured to perform:
bit counting by setting a bit count register to the number of bits when the first word from the first register is loaded into the second register and decrementing the bit count register for each bit loaded from the second register into the ALU,
word counting by decrementing the word count register when the bit count register is zero, and
leading zero detection upon the contents of the second register if a mode is a left-to-right mode, wherein leading zero detection comprises determining whether the second register is zero when the second register contains the first word, and loading the second word from the first register into the second register if the second register is zero or left-shifting the contents of the second register if the second register is not zero until a most significant bit of the second register is not zero.

17. The article according to claim 13, further comprising loading a most significant bit of the second register into the arithmetic logic unit if a left-to-right mode is selected or loading a least significant bit of the second register into the arithmetic logic unit if a right-to-left mode is selected, wherein mode selection is performed by a mode selector and the first word corresponds to a most significant word if the left-to-right mode is selected or the first word corresponds to a least significant word if the right-to-left mode is selected.

18. The article according to claim 13, further comprising performing exponent windowing upon the vector comprising scanning the second register to determine a group of bits to be multiplied wherein the group of bits to be multiplied comprises a number of bits less than or equal to a size of a window.

19. A system, comprising:
a plurality of line cards and a switch fabric interconnecting said plurality of line cards, at least one line card comprising:
at least one physical layer component (PHY); and
an integrated circuit (IC) configured to load a first word of an exponent vector having a plurality of words from memory into a first register, wherein the first register is configured to hold a number of bits corresponding to one word;
the IC further configured to load the first word from the first register to a second register, wherein the second register is configured to hold the number of bits corresponding to one word;
the IC further configured to load a second word of the exponent vector into the first register, wherein the second word is sequential in position to the first word in the exponent vector;
the IC further configured to load at least one bit from the second register into an arithmetic logic unit (ALU);
the IC further configured to perform modular exponentiation on the at least one bit from the second register to generate a first result;
the IC further configured to generate a public key based upon, at least in part, the first result;
the IC further configured to perform double exponentiation, wherein the IC is configured to:
load a third word of the exponent vector into a third register wherein the third register is configured to hold the number of bits corresponding to one word,
load the third word from the third register to a fourth register wherein the fourth register is configured to hold the number of bits corresponding to one word,
load a fourth word of the exponent vector into the third register, wherein the fourth word is sequential in position to the third word in the exponent vector,
load at least one bit from the fourth register to the ALU,
perform modular exponentiation on the at least one bit from the fourth register to generate a second result, and
generate a public key based upon, at least in part, the second result,
wherein the IC is further configured to alternate loading the at least one bit from the second register and the at least one bit from the fourth register into the ALU.

20. The system according to claim 19, wherein the IC is further configured to iteratively load each word of the plurality of words into the first register and to iteratively load each word from the first register to the second register if the second register is empty.

21. The system according to claim 20, wherein the vector is loaded from system memory.

* * * * *